(12) United States Patent
Daley et al.

(10) Patent No.: US 8,925,300 B2
(45) Date of Patent: Jan. 6, 2015

(54) ZERO CERIA WASHCOAT CATALYST MONITOR

(71) Applicants: James J Daley, Jackson, MI (US); Robert J Jerger, Dexter, MI (US); Wei-Jun Yang, Farmington Hills, MI (US); Jeffrey P Wuttke, Sterling Heights, MI (US); Michael G Zammit, White Lake, MI (US); Andrew Brocker, Jenison, MI (US)

(72) Inventors: James J Daley, Jackson, MI (US); Robert J Jerger, Dexter, MI (US); Wei-Jun Yang, Farmington Hills, MI (US); Jeffrey P Wuttke, Sterling Heights, MI (US); Michael G Zammit, White Lake, MI (US); Andrew Brocker, Jenison, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 114 days.

(21) Appl. No.: 13/716,639

(22) Filed: Dec. 17, 2012

(65) Prior Publication Data

US 2014/0165537 A1 Jun. 19, 2014

(51) Int. Cl.
    *F01N 11/00* (2006.01)
(52) U.S. Cl.
    CPC .................................. *F01N 11/007* (2013.01)
    USPC .................... 60/277; 60/274; 60/276; 60/299
(58) Field of Classification Search
    USPC ............................. 60/274, 276, 277, 285, 299
    See application file for complete search history.

(56) References Cited

U.S. PATENT DOCUMENTS

| | | | | |
|---|---|---|---|---|
| 5,732,553 A | * | 3/1998 | Mitsutani | 60/276 |
| 5,743,086 A | * | 4/1998 | Nagai | 60/276 |
| RE35,887 E | * | 9/1998 | Ishii et al. | 60/274 |
| 5,851,376 A | * | 12/1998 | Nishioka et al. | 205/784.5 |
| 6,797,517 B1 | * | 9/2004 | Hoshi et al. | 436/37 |
| 7,661,264 B2 | * | 2/2010 | Takubo | 60/285 |
| 2002/0026789 A1 | * | 3/2002 | Morinaga et al. | 60/277 |
| 2005/0138917 A1 | * | 6/2005 | Maki | 60/277 |
| 2007/0028596 A1 | * | 2/2007 | Takaku et al. | 60/277 |
| 2007/0220862 A1 | * | 9/2007 | Suehiro et al. | 60/277 |
| 2007/0227123 A1 | * | 10/2007 | Iida et al. | 60/277 |
| 2011/0020201 A1 | | 1/2011 | Luo et al. | |

* cited by examiner

*Primary Examiner* — Thomas Denion
*Assistant Examiner* — Jorge Leon, Jr.
(74) *Attorney, Agent, or Firm* — Ralph E Smith

(57) ABSTRACT

A catalyst degradation detection method for use with a zero ceria catalyst. The method uses techniques to measure transient responses to engine control events of upstream and downstream sensors to determine catalyst degradation and performance. By measuring transient behavior, the method can determine catalyst degradation and performance based on the limited oxygen storage of precious metal catalysts that do not include added ceria or other materials with high oxygen capture rates.

15 Claims, 7 Drawing Sheets

ZERO CERIA WASHCOAT CATALYST MONITOR

FIELD

The present disclosure relates to a diagnostic method for determining catalyst degradation and, more particularly, to a diagnostic method for determining catalyst degradation for a zero ceria washcoat catalyst.

BACKGROUND

Current automobiles are required to meet stringent emissions standards. These standards include both federal regulations (U.S. and foreign) and state specific regulations (i.e., California Air Resources Board (CARB)). The emissions standards not only set maximum emissions levels, but also require that vehicles containing onboard diagnostics (OBD) are capable of determining catalyst performance. In particular, the diagnostic system must be able to identify a catalyst that has degraded to the point of no longer providing effective removal of harmful emissions.

The traditional approach to detecting failed catalysts requires the addition of ceria, or other materials with high oxygen storage rates, to the catalysts. The high oxygen storage exhibited by these catalysts makes it possible to simply compare the oxygen level downstream from the catalyst to the oxygen level upstream from the catalyst to determine if the catalyst is performing correctly. An increase in downstream oxygen levels indicates a decrease in catalyst oxygen storage, which correlates to catalyst degradation and decreased performance. Zero ceria catalyst or catalysts with little or no oxygen storage present difficulties in determining catalyst degradation and performance. Therefore improvement in the art is desirable.

SUMMARY

The diagnostic method of the present disclosure involves measuring transient sensor responses to engine control events to monitor catalyst degradation and performance. By comparing upstream and downstream transient sensor responses to engine control events it is possible to monitor catalyst performance for a catalyst with no ceria or other high oxygen storage materials. This eliminates the cost of the added oxygen storage materials and allows the use of precious metal only catalysts while still complying with catalyst monitoring regulations. Different techniques are disclosed to measure transient response. They include response time, area under voltage curve, time delay, and signal length.

In one form, the present disclosure provides a method of determining catalyst degradation comprising detecting, by a processor, an engine control event; measuring a transient response of a first sensor upstream from the catalyst; measuring a transient response of a second sensor downstream from the catalyst; comparing the second sensor transient response to the first sensor transient response; and determining if the comparison of the second sensor transient response to the first sensor transient response exceeds a predefined threshold value. The method can take corrective action when the comparison exceeds the predefined threshold value. Taking corrective action can include illuminating a malfunction indicator lamp.

In another form, the present disclosure provides a catalyst diagnostic system comprising: a first sensor located upstream from a catalyst; a second sensor located downstream from the catalyst; and a control module configured to execute a method of determining catalyst degradation. The method of determining catalyst degradation can include detecting, by a processor, an engine control event; measuring a transient response of the first sensor; measuring a transient response of the second sensor; comparing the second sensor transient response to the first sensor transient response; and determining if the comparison of the second sensor transient response to the first sensor transient response exceeds a predefined threshold value. The first and second sensors can be $O_2$ sensors. The control module can also be configured to initiate the diagnostic subroutine only after determining that stable engine operating conditions have been achieved.

Measuring the transient response of the first and second sensors may include calculating a reaction time of the first and second sensors. The reaction times can be calculated by comparing the time at which the first and second sensors reach a predefined voltage to the time at which the engine control event occurs. Alternatively, measuring the transient response of the first and second sensors can include calculating a time delay between the first sensor response and the second sensor response. Calculating the time delay may include comparing the time value at which the first sensor voltage reaches a predefined value to the time value which the second sensor voltage reaches the predefined value.

Other techniques for measuring the transient responses of the first and second sensors can include calculating an area below the voltage curve for each sensor over a time period or calculating a signal length for each sensor over a time period. The time period can correspond to the duration of the engine control event.

The method can also include monitoring engine operating conditions and only initiating the diagnostic subroutine when predefined engine conditions are met. The predefined engine conditions can correspond to stable operating conditions. The diagnostic subroutine may only be initiated once for every time the engine is started such that the diagnostic subroutine is only repeated after the engine has been turned off and back on again.

Further areas of applicability of the present disclosure will become apparent from the detailed description provided hereinafter. It should be understood that the detailed description, including disclosed embodiments and drawings, are merely exemplary in nature intended for purposes of illustration only and are not intended to limit the scope of the invention, its application or use. Thus, variations that do not depart from the gist of the invention are intended to be within the scope of the invention.

DETAILED DESCRIPTION

Figure 1:
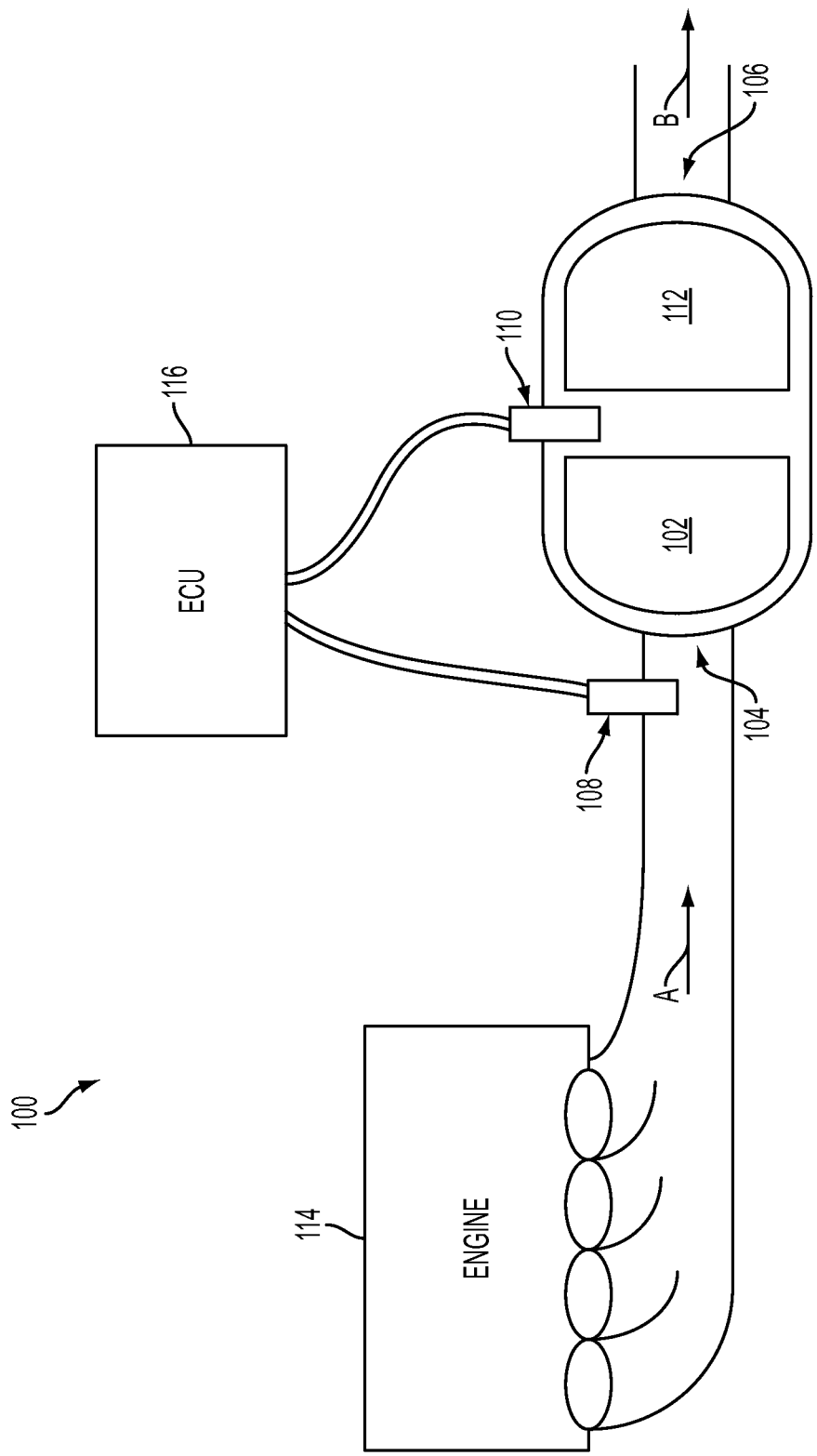
FIG. 1 illustrates a catalyst system disclosed herein.

Referring now to the drawings, FIGS. 1-6 illustrate embodiments of the catalyst monitoring method according to the present disclosure. FIG. 1 shows a catalyst system 100, which can be a catalytic converter or other exhaust treatment device. Exhaust gas flows from the engine 114 into inlet 104 (arrow A) and through the catalyst system 100 before exiting at outlet 106 (arrow B). Inside the catalyst system 100 there are one or more catalyst bricks (two bricks 102, 112, are shown in FIG. 1). The catalyst bricks 102, 112 are formed of materials that encourage chemical reactions and remove harmful materials from the exhaust gas flow. Over time the catalyst bricks 102, 112 can degrade, decreasing their ability to remove harmful exhaust components. Embodiments disclosed herein provide a diagnostic method for determining catalyst degradation and performance for zero ceria or low oxygen storage catalysts. In particular, such a method would enable the use of different catalyst structures and eliminate the expense of added ceria or other oxygen storage materials.

A first sensor 108 is placed upstream of catalyst brick 102 and is operable to detect certain constituents of the exhaust gas entering the catalyst system 100. Generally, sensor 108 is an $O_2$ sensor that outputs a voltage corresponding to the amount of oxygen in the exhaust gas entering the catalyst system 100. A similar sensor 110 is located downstream from catalyst brick 102. Sensor 110 can also be an $O_2$ sensor that outputs a voltage corresponding to the amount of oxygen in the exhaust gas after it has passed through catalyst brick 102. The sensors 108, 110 are attached to an engine control unit (ECU) 116 or other controller, which can record the values from the sensors 108, 110 and perform various calculations and system control adjustments.

Traditionally, catalyst brick 102 would contain ceria or another high oxygen storage material in addition to the precious metal catalyst. With the traditional arrangement, the oxygen level measured by sensor 108 would be high and the oxygen level measured by sensor 110 would be very low or near zero if the catalyst were performing correctly. Thus, for the traditional catalyst, it was possible to monitor catalyst degradation and performance by simply comparing the voltage output of the sensor 110 to that of sensor 108. An increase in oxygen observed at sensor 110 indicates that the catalyst brick 102 is no longer storing oxygen and has thus degraded or is failing to perform.

In the system 100 of the present disclosure, however, catalyst brick 102 does not contain ceria or any high oxygen storage material. The precious metal material making up catalyst brick 102 has limited oxygen storage and releases stored oxygen very quickly. This means that equilibrium is reached quickly and that the oxygen levels observed at the sensors 108, 110 tend to be very similar most of the time. In this instance, it becomes necessary to measure and compare transient behavior at the sensors 108, 110 to determine catalyst degradation and performance. By measuring transient responses resulting from engine control changes it is possible to monitor catalyst performance and degradation based on the limited oxygen storage that occurs in the precious metal materials of catalyst brick 102.

Figure 3:
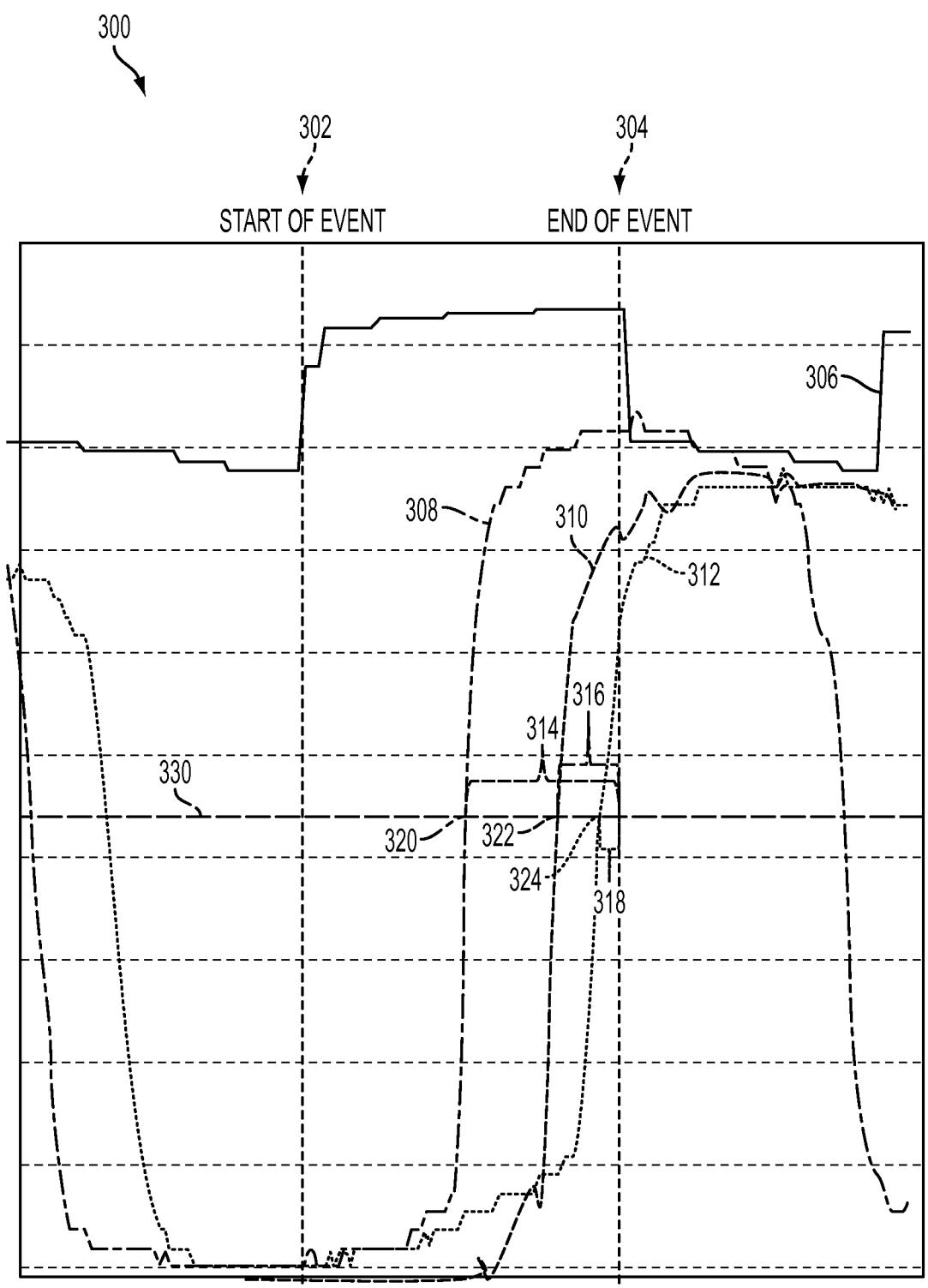
FIG. 3 is a chart showing example sensor responses and the calculation of reaction times.

FIG. 3 shows a first technique for measuring transient sensor response to monitor catalyst performance and degradation. For the purposes of this disclosure, the word "catalyst" refers to catalyst brick 102. It should be appreciated that it is possible to use a similar arrangement of sensors (one upstream from the catalyst brick and one downstream from the catalyst brick) to monitor other catalyst bricks such as 112. FIG. 3 is a chart 300 showing a number of different variables as they change over time. Line 306 shows the $O_2$ when the engine is operating under closed loop fuel control. $O_2$ sensor signal 308 is indicative of the amount of oxygen in the exhaust gas upstream from the catalyst, which corresponds to whether the fuel-to-air ratio is lean or rich. The ECU 116 monitors the $O_2$ sensor signal 308 as an input, along with other fueling calibrations and adjusts the engine operating fuel-to-air ratio by generating the $O_2$ factor signal 306. When the $O_2$ factor signal 306 transitions from lean to rich, an engine control event starts (302). As the signal transitions from rich to lean, the engine control event ends (304). The engine control event marks the beginning and end of the catalyst monitoring.

FIG. 3 shows an engine control event beginning at time 302 when the signal 308 from sensor 108 reaches a predetermined value (indicating a lean operating condition). The ECU triggers the engine control event, causing the step-like increase in $O_2$ factor 306 at time 302. In this example, the signal 308 from sensor 108 has reached a lower limit indicating that there is not enough fuel (mixture is lean) and the ECU 116 makes changes to the system to modify the fuel-to-air ratio. The engine control event continues until time 304 when the signal 308 from sensor 108 reaches the upper limit. All of the presently disclosed techniques work by measuring the transient response of the sensors 108, 110 during an engine control event such as the one that occurs between times 302 and 304.

Line 308 shows the voltage output of the $O_2$ sensor 108 positioned upstream from the catalyst brick 102. Higher voltages indicate less unburned oxygen, meaning the mixture is rich. Line 308 also indicates the level of oxygen in the exhaust gas entering the catalyst system 100 before it reaches the catalyst brick 102. Lines 310 and 312 show the voltages for downstream sensor 110. Line 310 corresponds to the sensor output that is expected of a degraded catalyst while line 312 shows the sensor output from a healthy catalyst.

Figure 2:
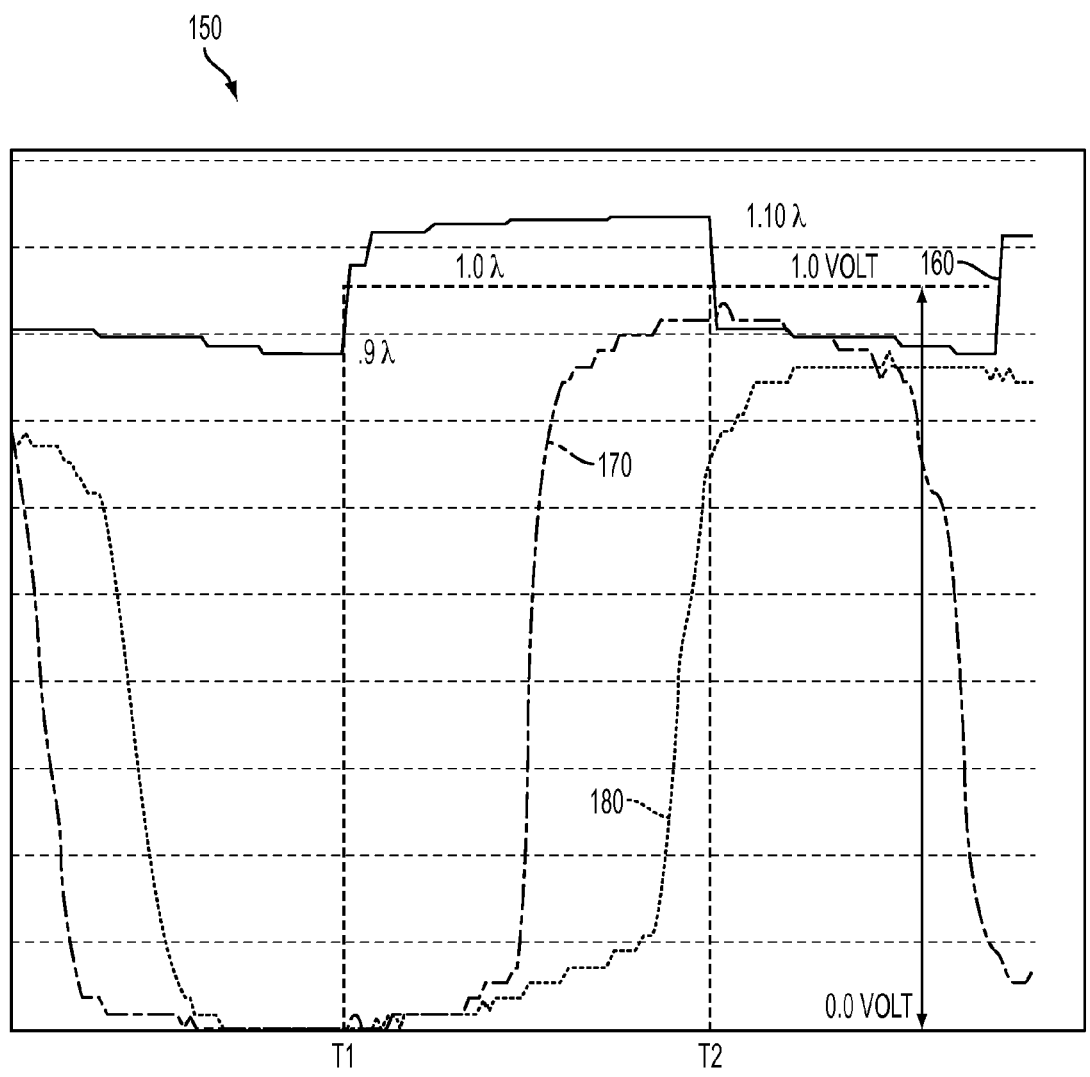
FIG. 2 is a chart showing the operating voltages of various signals.

FIG. 2 shows a chart 150 that includes the $O_2$ factor signal 160. Chart 150 also includes the signal 170 from sensor 108 and the signal 180 from sensor 110. From FIG. 2 it can be seen that the $O_2$ factor signal 160 generally varies between 0.9 lambda and 1.1 lambda. The signals 170, 180 from sensors 108, 110 generally vary between 0.0 volts and 1.0 volts. FIG. 2 does not show a particular technique, but is included to show the general operating voltages of the various signals discussed in reference to FIGS. 3-6.

As mentioned previously, the precious metal materials in the catalyst do exhibit some short term oxygen storage capabilities. Changes in the oxygen storage capability of the precious metal indicate degradation and decreased performance of the catalyst. It is possible to measure the degradation by comparing the reaction time for each of the sensors 108, 110. This is accomplished by comparing the time at which the sensor reaches a predefined voltage 330 to the time the engine control event ends (time 304). The predetermined voltage 330 can be any value in the operating range of the sensors 108, 110. For sensor 108, this means comparing the time for point 320 to time 304. For sensor 110, this means comparing the time for points 322 or 324 to time 304.

The reaction time 314 of the upstream sensor 108 indicates how long it takes for the sensor to observe a change in oxygen level in the exhaust gas due to the engine control event. This reaction time 314 is a baseline as it is unaffected by catalyst performance. The reaction time (316 or 318) relative to the downstream sensor 110 indicates how long it takes for the sensor downstream from the catalyst to observe the change in oxygen level due to the control event. This value, however, is affected by the catalyst because the oxygen storage of the catalyst delays the response of the downstream sensor 110.

The ratio of the response time (316 or 318) of the downstream sensor 110 to the response time 314 of the upstream sensor 108 is indicative of catalyst performance and degradation. The ratio approaches one as the catalyst degrades because the oxygen storage capacity decreases resulting in less lag between the upstream sensor response and the downstream sensor response. When the ratio reaches a predetermined threshold, the controller is configured to illuminate a malfunction indicator lamp to alert the driver of the issue and facilitate repairs. While the calculations are discussed relative to specific reference times (in this instance time 304) other reference times can be used. Additionally, the measurements can be made while voltages are decreasing in response to the rich to lean conversion as opposed to increasing voltages due to lean to rich conversion as shown.

Figure 4:
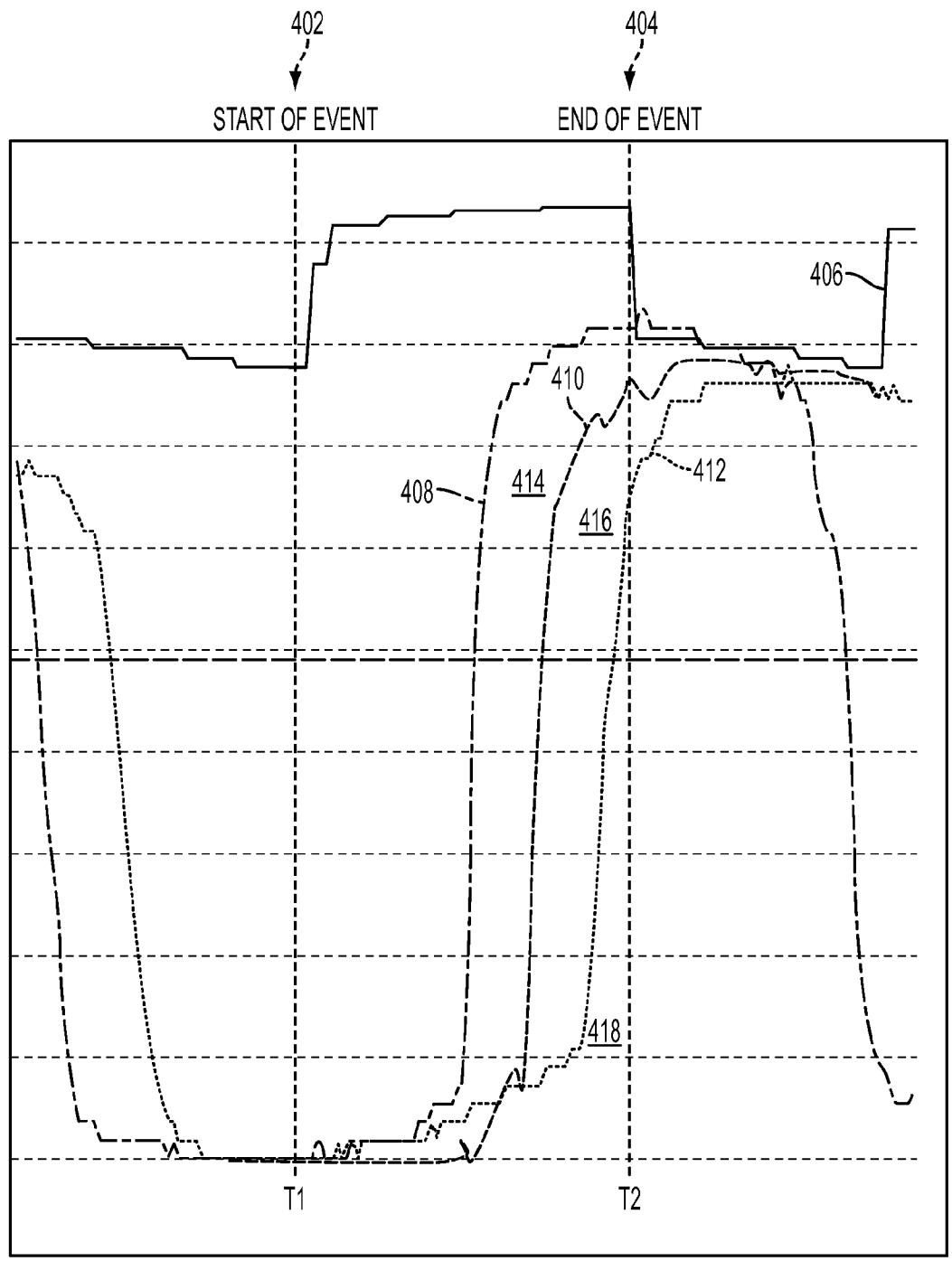
FIG. 4 is a chart showing example sensor responses and the calculation of areas below the response curves.

FIG. 4 shows a second technique for measuring transient sensor response to monitor catalyst performance and degradation. In this instance, the areas under the voltage curves are calculated and compared. In FIG. 4, the $O_2$ factor is shown by line 406 and the same engine control event discussed in reference to FIG. 3 starts at time 402 and ends at time 404. A first line 408 shows the voltage from the upstream sensor 108 and lines 410 and 412 show the voltage from downstream sensor 110 for catalysts at two different performance or degradation levels.

In this technique, the areas under the voltage curves between times 402 and 404 are calculated by integrating the voltage curves. This calculation results in an area corresponding to each line 408, 410, and 412. In this instance, the area 414 under upstream voltage curve represents the baseline response due to the engine control event. Areas 416 and 418 corresponding to lines 410 and 412, respectively, represent the downstream response due to the control event with a delay due to the oxygen storage of the catalyst. Here the ratio of the area under the downstream sensor curve (416 or 418) to the area under the upstream sensor curve 414 is indicative of catalyst performance and degradation. The ratio approaches one as the catalyst degrades because the oxygen storage capacity decreases, resulting in less lag between the upstream sensor response and the downstream sensor response. When the ratio reaches a predetermined threshold, the controller is configured to illuminate a malfunction indicator lamp to alert the driver of the issue and facilitate repairs.

Figure 5:
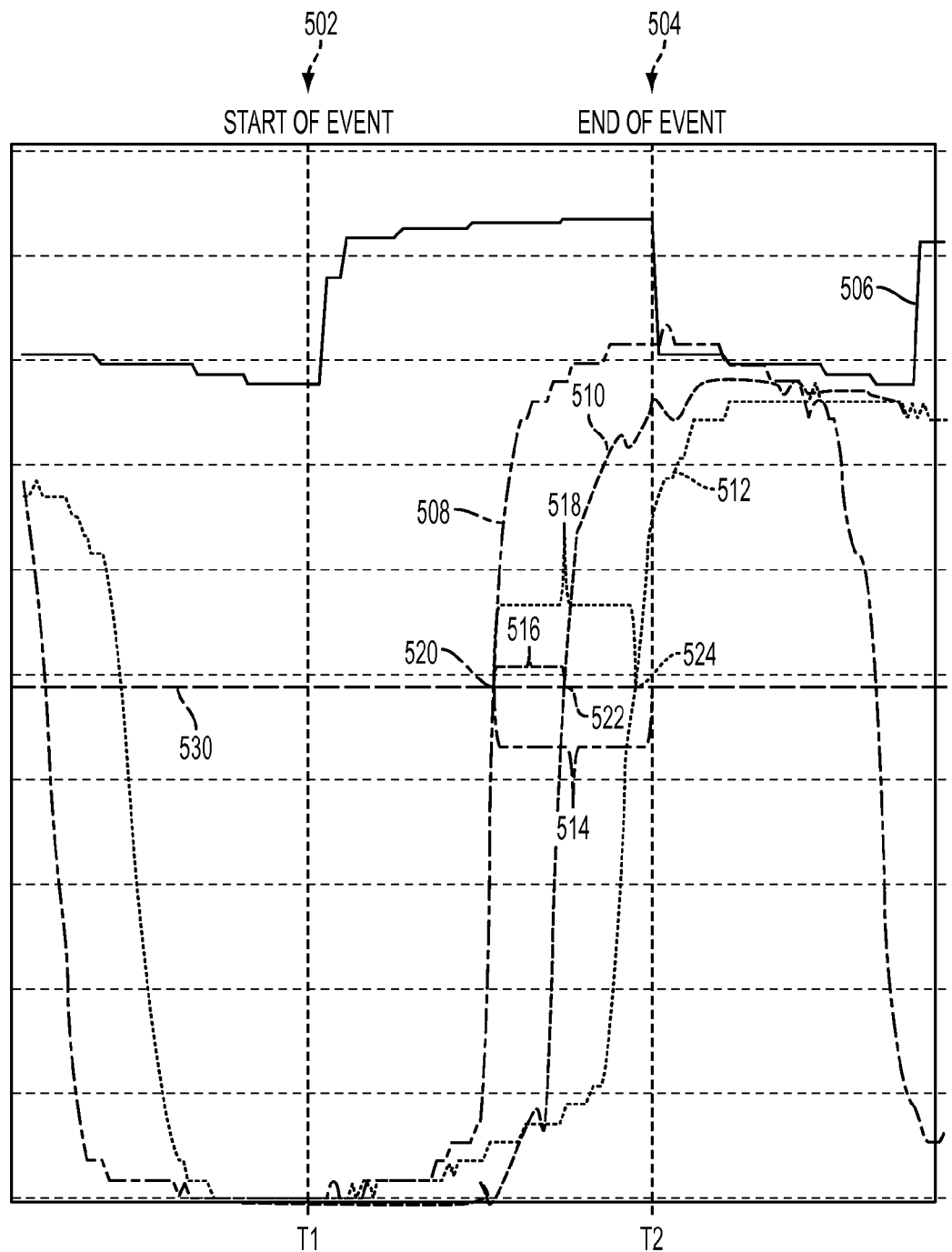
FIG. 5 is a chart showing example sensor responses and the calculation of time delays.

FIG. 5 shows a third technique for measuring transient sensor response to monitor catalyst performance and degradation. In this instance, the time delay of the voltage curves for the downstream sensor 110 are calculated and compared to a maximum time delay. In FIG. 5, the $O_2$ factor is shown by line 506 and the same engine control event discussed in reference to FIGS. 3 and 4 starts at time 502 and ends at time 504. A first line 508 shows the voltage from the upstream sensor 108 and lines 510 and 512 show the voltage from downstream sensor 110 for catalysts at two different performance or degradation levels.

In this technique, the time 520 at which the upstream sensor 108 reaches a predetermined voltage 530 is compared to the time (522 or 524) at which the downstream sensor 110 reaches the same predetermined voltage 530. Additionally, the time 520 at which the upstream sensor 108 reaches the predetermined voltage 530 is compared to the time 504 at the end of the engine control event to determine a maximum delay 514. The predetermined voltage can be any value in the operating range of the sensors 108, 110. The time delay (516 or 518) for the downstream sensor is subtracted from the maximum time delay 514 to produce a value indicative of the catalyst performance and degradation. As the measured delay (516 or 518) decreases, this value increases representing an increase in catalyst degradation and a decrease in catalyst performance. When the value reaches a predetermined threshold, the controller is configured to illuminate a malfunction indicator lamp to alert the driver of the issue and facilitate repairs.

Figure 6:
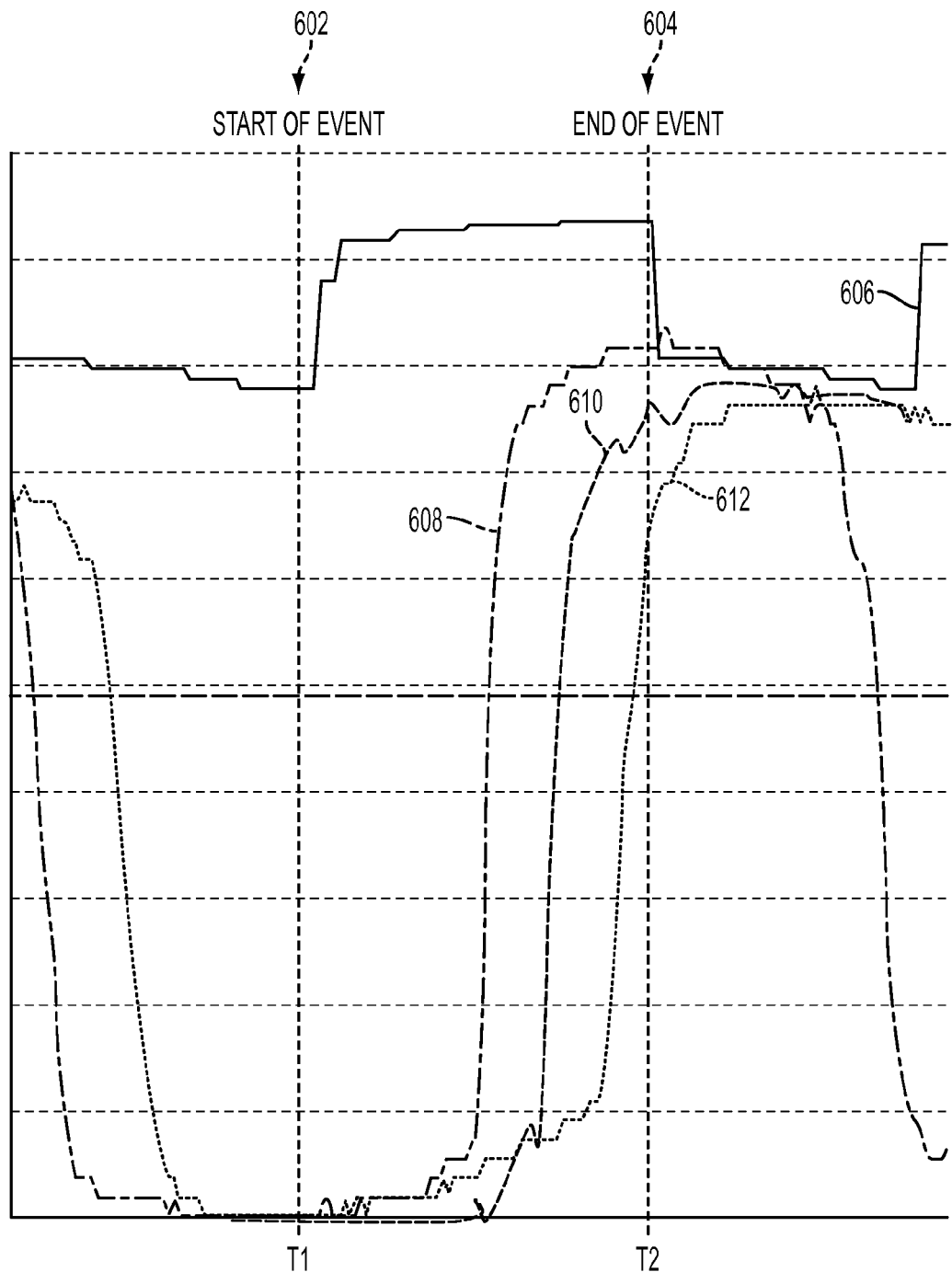
FIG. 6 is a chart showing example sensor responses and the calculation of signal lengths.

FIG. 6 shows a fourth technique for measuring transient sensor response to monitor catalyst performance and degradation. In this instance, the lengths of the voltage signals are calculated and compared. In FIG. 6, the $O_2$ factor is shown by line 606 and the same engine control event discussed in reference to FIGS. 3-5 starts at time 602 and ends at time 604. A first line 608 shows the voltage from the upstream sensor 108 and lines 610 and 612 show the voltage from downstream sensor 110 for catalysts at two different performance or degradation levels.

In this technique, the length of the voltage curves between time 602 and time 604 is calculated. This results in lengths corresponding to each line 608, 610, and 612. In this instance, the length of the upstream voltage curve 608 represents the baseline response due to the engine control event. The lengths of lines 610 and 612 between times 602 and 604, represent the downstream response due to the control event with a delay due to the oxygen storage of the catalyst. Here the ratio of the length of the downstream sensor curve (610 or 612) to the length of the upstream sensor curve 608 is indicative of catalyst performance and degradation. The ratio approaches one as the catalyst degrades because the oxygen storage capacity decreases resulting in less lag between the upstream sensor response and the downstream sensor response. When the ratio reaches a predetermined threshold, the controller is configured to illuminate a malfunction indicator lamp to alert the driver of the issue and facilitate repairs.

Figure 7:
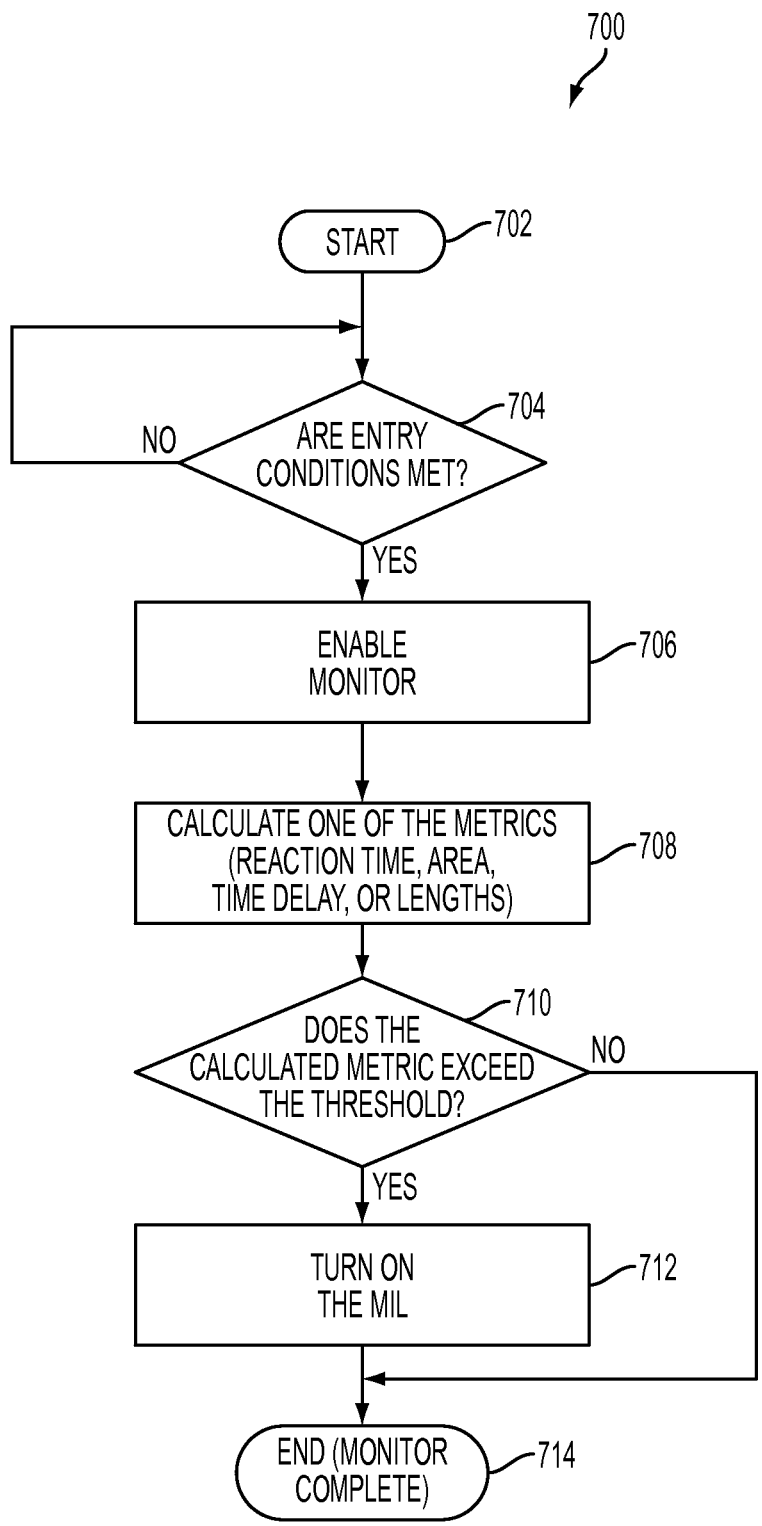
FIG. 7 is a flowchart showing the initiation and operation of the disclosed method.

FIG. 7 is a flowchart showing an example initiation and operation of the diagnostic method 700 in a controller. The controller can be an engine control unit (such as ECU 116), which can include a processor programmed to perform the methods discussed herein and/or other necessary controller functions. The method and calculations required can be embodied in software and stored on a non-transitory medium for execution by the engine control unit 116 or another processor. At step 702, the process is started when the engine is turned on. At step 704, the controller monitors engine operating conditions to determine if entry conditions have been met. Entry conditions can be any set of requirements, but generally correspond to some minimal level of stable operating conditions including closed loop fuel control. If the entry conditions are not met, the process 700 restarts at step 702. If the entry conditions are met, the process 700 continues to step 706 where the monitor is enabled. It is at this point that a diagnostic subroutine is triggered to verify catalyst performance. At step 708, one of the above discussed techniques is carried out to measure transient sensor response. Step 708 includes detecting an engine control event, recording measured data from the sensors, and performing calculations (as discussed above with reference to FIGS. 3-6).

Next, at step 710, it is determined if the calculated value meets or exceeds predetermined thresholds indicating catalyst degradation. If the thresholds are exceeded, the process continues to 712 where a malfunction indicator lamp (MIL) is illuminated before the process ends at 714. It should be appreciated that other types of indicators could be provided, including e.g., an audible indicator or message. If the thresholds are not met, meaning that the catalyst is performing normally and not degraded, then the process ends at 714. Although it is possible to run the catalyst monitor process 700 numerous times it is generally only triggered once for every time the engine is turned on. Therefore in a desired embodiment, once the process 700 has completed at 714 it will not repeat until the engine is turned off and back on again.

What is claimed is:

1. A method of determining catalyst degradation of a catalyst, the method comprising:
   detecting, by a processor, an engine control event;
   measuring a transient response of a first sensor upstream from the catalyst;
   measuring a transient response of a second sensor downstream from the catalyst;
   calculating a reaction time of the first sensor to the engine control based on the measured transient response of the first sensor;
   calculating a reaction time of the second sensor to the engine control event based on the measured transient response of the second sensor;
   comparing the reaction time of the second sensor to the reaction time of the first sensor;
   determining if the comparison of the reaction time of the second sensor to the reaction time of the first sensor is less than a predefined threshold value; and
   taking corrective action if it is determined that the comparison of the reaction time of the second sensor to the reaction time of the first sensor is less than the predefined threshold value. to the first sensor transient response exceeds a predefined threshold value.

2. The method of determining catalyst degradation of claim 1, wherein taking corrective action includes illuminating a malfunction indicator lamp.

3. The method of determining catalyst degradation of claim 1, wherein, the reaction time of the first and second sensors is calculated by comparing a time at which each of the first and second sensors reach a predefined voltage to the time at which the engine control event occurs.

4. The method of determining catalyst degradation of claim 1, wherein measuring the transient response of the first and second sensors includes calculating an area below a voltage curve for each sensor over a time period.

5. The method of determining catalyst degradation of claim 4, wherein the time period corresponds to the duration of the engine control event.

6. The method of determining catalyst degradation of claim 1, wherein measuring the transient response of the first and second sensors includes calculating a time delay between the first sensor response and the second sensor response.

7. The method of determining catalyst degradation of claim 6, wherein calculating the time delay includes comparing a time value at which the first sensor voltage reaches a predefined value to a time value at which the second sensor voltage reaches the predefined value.

8. The method of determining catalyst degradation of claim 1, wherein measuring the transient response of the first and second sensors includes calculating a signal length for each sensor over a time period.

9. The method for determining catalyst degradation of claim 8, wherein the time period corresponds to the duration of the engine control event.

10. A catalyst diagnostic system comprising:
    a first sensor located upstream from a catalyst;
    a second sensor located downstream from the catalyst; and
    detect an engine control event;
       measure a transient response of the first sensor;
       measure a transient response of the second sensor;
       calculate a reaction time of the first sensor to the engine control event based on the measured transient response of the first sensor;
       calculate a reaction time of the second sensor to the engine control event based on the measured transient response of the second sensor;
       compare the reaction time of the second sensor to the reaction time of the first sensor;
       determine if the comparison of the reaction time of the second sensor to the reaction time of the first sensor is less than a predefined threshold value; and
       take corrective action if the comparison of the reaction time of the second sensor to the reaction time of the first sensor is less than the predefined threshold value.

11. The catalyst diagnostic system of claim 10, wherein the engine control unit is further configured to calculate the reaction time of the first and second sensors by comparing a time at which each of the first and second sensors reach a predefined voltage to a time at which the engine control event occurs.

12. The catalyst diagnostic system of claim 10, wherein the engine control unit is further configured to calculate an area below the voltage curve for each sensor over a time period to measure the transient response of the first and second sensors.

13. The catalyst diagnostic system of claim 10, wherein the engine control unit is further configured to calculate a time delay between the first sensor response and the second sensor response to measure the transient response of the first and second sensors.

14. The catalyst diagnostic system of claim 10, wherein the engine control unit is further configured to calculate a signal length for each sensor over a time period to measure the transient response of the first and second sensors.

15. The catalyst diagnostic system of claim 10, wherein the first and second sensors are $O_2$ sensors.

* * * * *